United States Patent
Krishnan et al.

(10) Patent No.: US 10,997,462 B2
(45) Date of Patent: May 4, 2021

(54) DEVICES, SYSTEMS, AND METHODS FOR CLUSTERING REFERENCE IMAGES FOR NON-DESTRUCTIVE TESTING

(71) Applicant: Canon Virginia, Inc., Newport News, VA (US)

(72) Inventors: Nikhil Krishnan, Lake Forest, CA (US); Bradley Scott Denney, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 145 days.

(21) Appl. No.: 16/366,880

(22) Filed: Mar. 27, 2019

(65) Prior Publication Data

US 2019/0311224 A1   Oct. 10, 2019

Related U.S. Application Data

(60) Provisional application No. 62/652,561, filed on Apr. 4, 2018.

(51) Int. Cl.
| | |
|---|---|
| *G06K 9/00* | (2006.01) |
| *G06K 9/62* | (2006.01) |
| *G06T 3/00* | (2006.01) |
| *G06T 7/30* | (2017.01) |
| *G06T 7/00* | (2017.01) |

(52) U.S. Cl.
CPC ........... *G06K 9/6255* (2013.01); *G06K 9/622* (2013.01); *G06K 9/6215* (2013.01); *G06K 9/6257* (2013.01); *G06T 3/0075* (2013.01); *G06T 7/30* (2017.01); *G06T 7/001* (2013.01); *G06T 2207/20081* (2013.01)

(58) Field of Classification Search
CPC combination set(s) only.
See application file for complete search history.

(56) References Cited

U.S. PATENT DOCUMENTS

| | | | |
|---|---|---|---|
| 6,005,978 A | 12/1999 | Garakani | |
| 6,295,083 B1 | 9/2001 | Kuhn | |
| 6,320,976 B1 | 11/2001 | Murthy | |
| 6,690,840 B1 | 2/2004 | Janko | |
| 7,318,005 B1 | 1/2008 | Smaragdis | |
| 7,440,607 B1 | 10/2008 | Lin | |
| 7,715,623 B2 | 5/2010 | Ling | |
| 8,103,085 B1 * | 1/2012 | Zadeh | G06T 7/001 382/141 |
| 8,107,717 B2 | 1/2012 | Maeda | |
| 8,131,107 B2 | 3/2012 | Sun | |

(Continued)

OTHER PUBLICATIONS

Alfonso Alba et al., Phase Correlation Based Image Alignment with Subpixel Accuracy, Nov. 2012.

(Continued)

*Primary Examiner* — Iman K Kholdebarin
(74) *Attorney, Agent, or Firm* — Canon U.S.A., Inc. IP Division

(57) ABSTRACT

Devices, systems, and methods obtain training images; generate image-alignment data based on the training images; cluster the training images based at least in part on the image-alignment data, thereby generating clusters of training images; and select one or more representative images from the training images based on the clusters of training images.

21 Claims, 10 Drawing Sheets

(56) References Cited

U.S. PATENT DOCUMENTS

| | | |
|---|---|---|
| 8,238,635 B2 | 8/2012 | Can |
| 8,345,949 B2 | 1/2013 | Zhao |
| 8,442,301 B2 | 5/2013 | Dragovich |
| 8,774,510 B2 | 7/2014 | Xu |
| 8,811,712 B2 | 8/2014 | Maeda |
| 8,867,787 B2 | 10/2014 | Singamsetti |
| 9,170,543 B2 | 10/2015 | Arakawa |
| 9,256,920 B1 | 2/2016 | Choudhury |
| 9,378,552 B2 | 6/2016 | Sato |
| 9,400,256 B2 | 7/2016 | Henderkott |
| 9,405,991 B2 | 8/2016 | Sharma |
| 9,460,490 B2 | 10/2016 | Choudhury |
| 9,619,755 B2 | 4/2017 | Wang |
| 10,552,977 B1* | 2/2020 | Theis ................ G06K 9/00228 |
| 2002/0097342 A1 | 7/2002 | Hu |
| 2006/0088207 A1* | 4/2006 | Schneiderman ..... G06K 9/6296 |
| | | 382/159 |
| 2007/0086677 A1* | 4/2007 | Sabuncu ................ G06T 7/35 |
| | | 382/294 |
| 2007/0127798 A1* | 6/2007 | Chakraborty ........... G06F 16/58 |
| | | 382/128 |
| 2008/0101722 A1 | 5/2008 | Bryll |
| 2009/0268984 A1 | 10/2009 | Intwala |
| 2010/0220910 A1 | 9/2010 | Kaucic |
| 2012/0195495 A1* | 8/2012 | Shiell ................... G06K 9/6219 |
| | | 382/159 |
| 2013/0136322 A1* | 5/2013 | Zhan ......................... G06T 7/73 |
| | | 382/128 |
| 2014/0270489 A1 | 9/2014 | Lim |
| 2015/0227809 A1 | 8/2015 | Alpert |
| 2016/0140716 A1* | 5/2016 | Kadir ........................ G06T 7/30 |
| | | 382/131 |
| 2016/0379351 A1* | 12/2016 | Michael ................. G06T 7/344 |
| | | 348/46 |
| 2017/0263023 A1* | 9/2017 | Zhou ..................... G06T 19/00 |
| 2017/0330059 A1* | 11/2017 | Novotny ............ G06K 9/00664 |
| 2017/0337682 A1* | 11/2017 | Liao ........................ G06T 7/30 |
| 2018/0286081 A1* | 10/2018 | Koperski ........... G06K 9/00771 |
| 2019/0050687 A1* | 2/2019 | Albrecht .............. G06K 9/0063 |

OTHER PUBLICATIONS

J. B. Antoine Maintz et al., An Overview of Medical Image Registration Methods, Imaging Science Department, Imaging Center Utrecht, Dec. 1996.

Mike Nese, Automatic Image Alignment, Nov. 2011.

Richard Szeliski, Image Alignment and Stitching: A Tutorial, Dec. 2006.

Mahdieh Poostchi et al., Multi-Scale Spatially Weighted Local Histograms in O(1), Oct. 2017.

Nick Kingsbury, Complex Wavelets for Shift Invariant Analysis and Filtering of Signals, May 2001.

Roumen Kountchev et al., Defects detection in X-ray images and photos, Feb. 2011.

J. Hassan et al., Welding Defect Detection and Classification Using Geometric Features, Dec. 2012.

Shekhar B. Sastry, Computationally Efficient Methods for Shift-variant Image Restoration in Two and Three Dimensions, Sep. 2011.

Ian T. Young et al., Fundamentals of Image Processing, Jul. 2004.

Tian Yuan et al., Automatic Defect Detection in X-Ray Images Using Image Data Fusion, Dec. 2006.

Caixia Zheng et al., An improved method for object detection in astronomical images, Jun. 2015.

V Lashkia, Defect detection in X-ray images using fuzzy reasoning, Image and Vision Computing, vol. 19, Issue 5, Apr. 2001, Abstract.

Seunghoon Hong et al., Joint Image Clustering and Labeling by Matrix Factorization, Oct. 7, 2015.

Yi-Chen Chen et al., In-Plane Rotation and Scale Invariant Clustering Using Dictionaries, Feb. 8, 2013.

T.J. Ramirez-Rozo et al., Infrared thermal image segmentation using expectation-maximization-based clustering, Sep. 2012.

\* cited by examiner

DEVICES, SYSTEMS, AND METHODS FOR CLUSTERING REFERENCE IMAGES FOR NON-DESTRUCTIVE TESTING

CROSS-REFERENCE TO RELATED APPLICATIONS

This application claims the benefit of U.S. Application No. 62/652,561, which was filed on Apr. 4, 2018.

BACKGROUND

Technical Field

This application generally concerns computer vision that detects features in images.

Background

Computer-vision systems can detect visual features in images. For example, nondestructive computer-vision testing techniques can be used to examine the properties of objects without causing damage to the objects. These techniques can be used in a quality-control process to identify defects in the objects.

SUMMARY

Some embodiments of a device comprise one or more computer-readable storage media and one or more processors. The one or more processors are configured to cause the device to perform operations that include obtaining training images; generating image-alignment data based on the training images; clustering the training images based at least in part on the image-alignment data, thereby generating clusters of training images; and selecting one or more representative images from the training images based on the clusters of training images.

Some embodiments of a method comprise obtaining training images; generating image-alignment data based on the training images; clustering the training images based at least in part on the image-alignment data, thereby generating clusters of training images; and selecting representative images from the training images based on the clusters of training images.

Some embodiments of one or more computer-readable media store instructions that, when executed by one or more computing devices, cause the one or more computing device to execute operations that comprise obtaining training images; generating image-alignment data based on the training images; clustering the training images based at least in part on the image-alignment data, thereby generating clusters of training images; and selecting representative images from the training images based on the clusters of training images.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
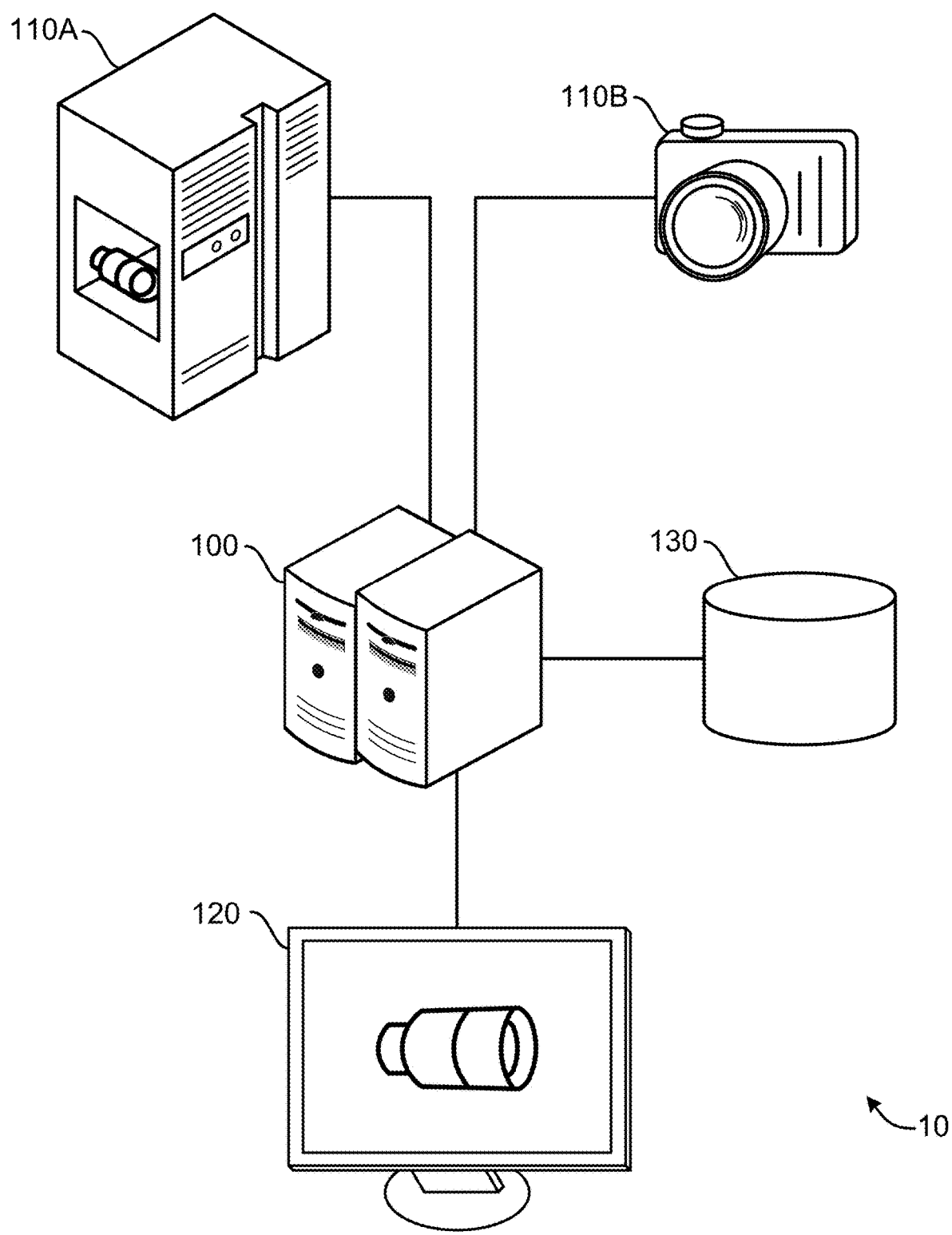
FIG. 1 illustrates an example embodiment of a system for image-feature detection.

FIG. 1 illustrates an example embodiment of a system for image-feature detection. The system 10 includes one or more detection devices 100, which are specially-configured computing devices; one or more image-capturing devices, such as an x-ray detector 110A or a camera 110B; at least one display device 120, and a reference-image repository 130, which is a storage device. In some embodiments, the one or more detection devices 100 include the reference-image repository 130.

The one or more detection devices 100 are configured to obtain one or more images of an object from one or both of the image-capturing devices. The one or more detection devices 100 are also configured to detect features (e.g., defects, anomalies, outliers) in the one or more images of the object. The features may indicate defects or anomalies in the object that is depicted by the image.

Some embodiments of the one or more detection devices 100 detect the features in a test image using the reference images that are stored in the reference-image repository 130, for example by comparing the test image to one or more of the reference images or by training one or more classifiers using the reference images. The reference images may depict natural variations that occur when presenting a part to x-ray inspection equipment, and multiple reference images may capture a training-dataset variability. And the results of the comparison may be improved by using more reference images. However, increasing the number of reference images sometimes creates a computational workload that linearly increases with the number of reference images, whereas the incremental return for using more reference images may decrease as more images are used. Accordingly, some embodiments of the one or more detection devices 100 maximize image-content variations of the reference images while minimizing the number of reference images or maximizing the variations of image non-linearity (e.g., warping), for example variations caused by positioning variations of inspection robotics.

Some embodiments of the one or more detection devices 100 organize or select the reference images to maximize the variations in the images' contents. This potentially captures the variations in the reference images, such as texture variations, out-of-plane rotations, noise, and other alignment-related variations (e.g., variations that are not captured with an alignment algorithm). Some of these embodiments use clustering-based techniques to select the reference images from a set of training images. For example, some embodiments of the one or more detection devices 100 cluster the training images and select the images in the clusters that are closest to the cluster centers to use as reference images.

Figure 2:
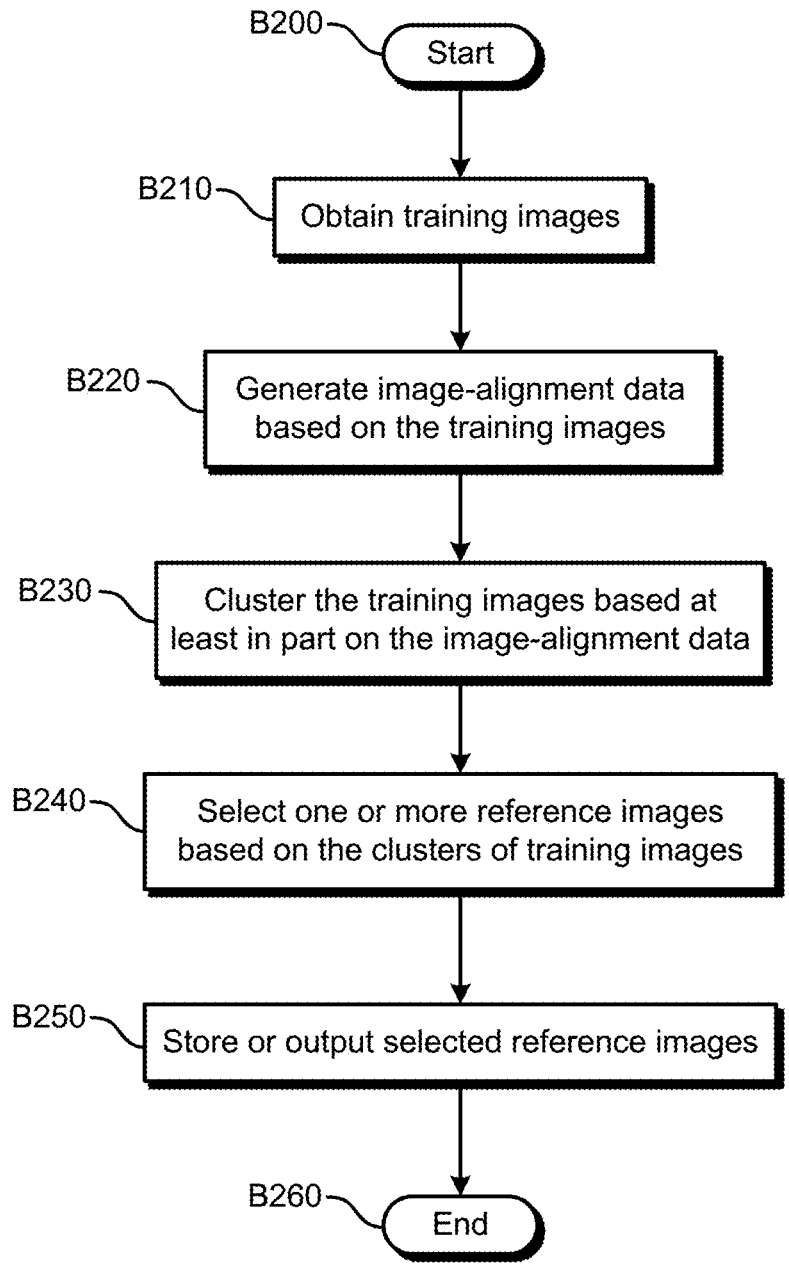
FIG. 2 illustrates an example embodiment of an operational flow for selecting reference images.

FIG. 2 illustrates an example embodiment of an operational flow for selecting reference images. Although this operational flow and the other operational flows that are described herein are presented in a certain order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations from more than one of the embodiments that are described herein. For example, some embodiments may include one or more blocks from the operational flow in FIG. 3 and one or more blocks from the operational flow in FIG. 4. Thus, some embodiments of the operational flows may omit blocks, add blocks, change the order of the blocks, combine blocks, or divide blocks into more blocks relative to the example embodiments of the operational flows that are described herein.

Furthermore, although the embodiments of the operational flows that are described herein are performed by a detection device, some embodiments of these operational flows are performed by two or more detection devices or by one or more other specially-configured computing devices.

The operational flow in FIG. 2 starts in block B200 and then moves to block B210, where the detection device obtains one or more training images. Next, in block B220, the detection device generates image-alignment data based on the training images. For example, some embodiments of detection device select an alignment-target image from the training images, align the other training images to the alignment-target image, and then project the aligned images into a subspace. And in some embodiments, the detection device calculates transformations (e.g., pair-wise transformations) that it can use to align the training images with each other and uses these alignment transformations as image-alignment data. The aligned training images, the projections of the aligned training images in a subspace, and the transformations are examples of image-alignment data. The detection device can use the image-alignment data to account for differences in the alignments of the training images.

Next, in block B230, the detection device clusters the training images based at least in part on the image-alignment data. In some embodiments, the detection device also performs a dimensionality reduction before or concurrently with the clustering.

The flow then moves to block B240, where the detection device selects one or more reference images based on the clusters of training images. For example, the detection device may select the training images that are not cluster outliers (e.g., belong to a cluster of one) as reference images, or the detection device may select at least one training image (e.g., a median image, a centroid image) from each cluster as the reference images.

In block B250, the detection device stores or outputs the selected reference images, and the detection device can use the reference images to find one or more defects in a test image of an object.

Figure 3:
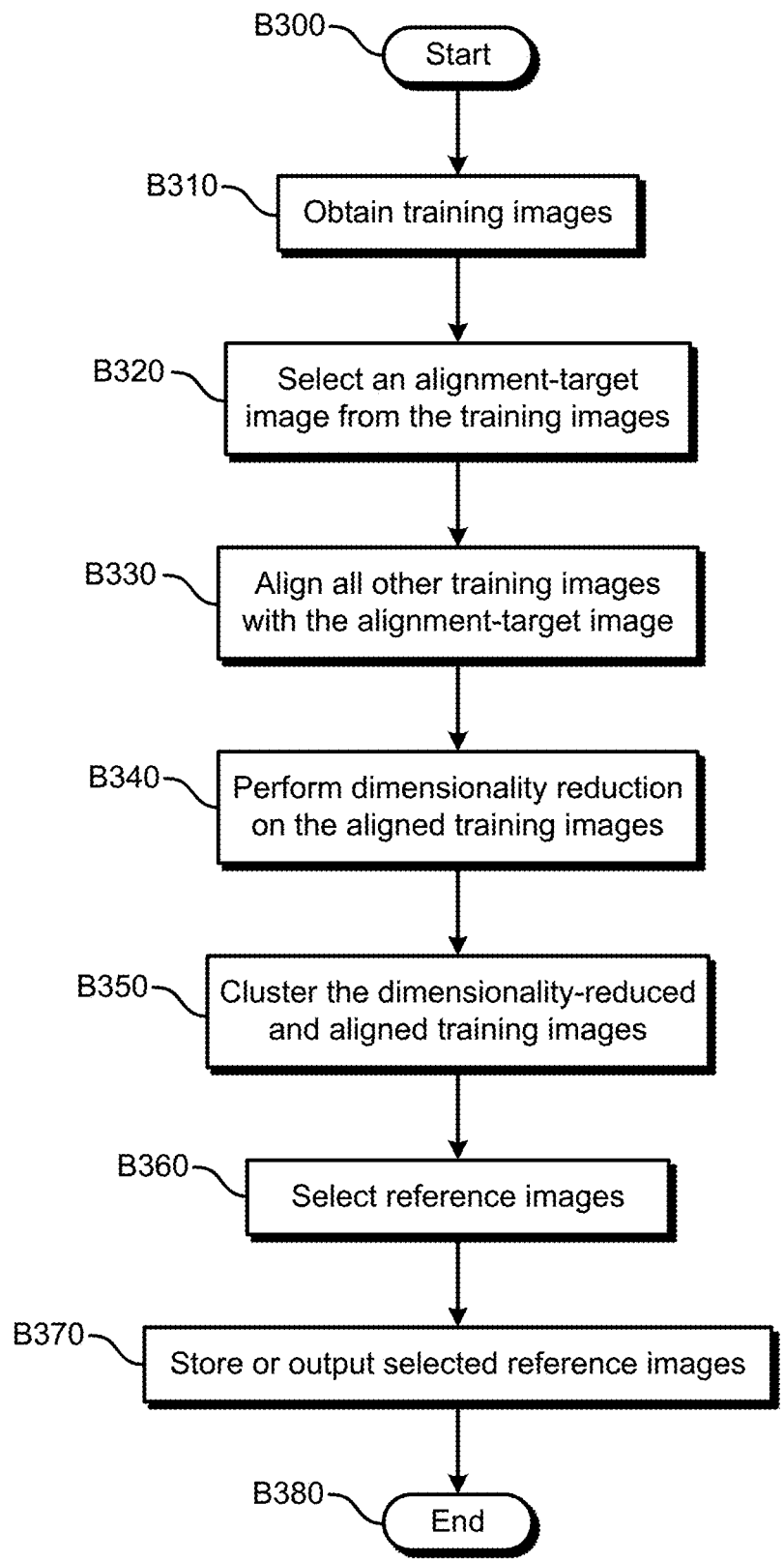
FIG. 3 illustrates an example embodiment of an operational flow for selecting reference images.

FIG. 3 illustrates an example embodiment of an operational flow for selecting reference images. The operational flow starts in block B300 and then moves to block B310, where the detection device obtains training images (e.g., a set of training images). Some sets of training images can be described by the following:

$$X = \{x_n\}_{n=1}^{n_{train}}, \quad (1)$$

where X is the set of training images, where $x_n$ is a training image, and where $n_{train}$ is the number of training images in the set.

Next, in block B320, the detection device selects an alignment-target image from the training images. In some circumstances, the selection of reference images can become problematic if clustering is applied directly to the training images without compensating for differences in their alignments. For example, if an alignment is not performed, the operational flow may output two images that are very similar in appearance, but that are translated or rotated relative to each other, as two reference images, which may not be ideal. If the reference images and a test image are aligned before defect detection, then performing the clustering on the aligned training images may provide superior results.

Accordingly, in block B330 the detection device aligns all of the other training images to the target-alignment image, for example using one or more selected alignment algorithms, thereby generating aligned training images $\{t(i)\}_{n=1}^{n_{train}}$, which are examples of image-alignment data. Also, examples of alignment algorithms include translations, Euclidean transformations, affine transformations, and homographic transformations.

The flow then proceeds to block B340, where the detection device performs dimensionality reduction on the aligned training images $\{t(i)\}_{n=1}^{n_{train}}$, (image-alignment data).

For example, in some embodiments, the images have a very high dimensionality (e.g., contain many pixels), and clustering the high-dimensional images may not be very meaningful due to the "curse of dimensionality." Therefore, dimensionality reduction may be performed before performing the clustering. In some embodiments, the maximum number of dimensions that are retained can be described by the following:

$$d_{red} \leq \min(d_{image}, n_{train}), \quad (2)$$

where $d_{red}$ is the reduced dimensionality, where $d_{image}$ is the total dimensionality of the training images (e.g., a vectorized training image), and where $n_{train}$ is the number of training images.

For example, some embodiments of the detection device use principal component analysis (PCA) to perform the dimensionality reduction. In some of these embodiments, the coefficient vector of dimension $d_{red}$ is computed by correlating principal components of the PCA with a training image, for example as described by the following:

$$c_{(d_{red} \times 1)}(i) = P_{(d_{red} \times d_{image})} t(i)_{(d_{image} \times 1)}, \quad (3)$$

where c(i) is the coefficient vector corresponding to the $i^{th}$ vectorized training image t(i), and where P is the matrix for the largest $d_{red}$ principal components of the training data set.

The resulting coefficient vector set $C=\{c(i) \forall\ i \in [1, n_{train}]\}$ may be input to a clustering procedure. Furthermore, the number of training images may need to be specified based on the clustering procedure.

Then, in block B350, the detection device clusters the dimensionality-reduced and aligned training images, for example the resulting coefficient vector set $C=\{c(i) \forall\ i \in [1, n_{train}]\}$.

Next, in block B360, the detection device removes the isolated images (e.g., images that are the only image in their respective cluster) from the clusters of dimensionality-reduced and aligned training images. In some embodiments, the set of training images contains images in which the object of interest is not completely in the field of view. This may be caused by issues from the placement of the object relative to the image-capturing device. Such images may be dissimilar to a majority of the training images (which have a view of the complete object of interest) and have a high chance of getting selected as reference images. To avoid selecting such images as reference images, the detection device can identify them by counting the number of other images that belong to the cluster that includes this reference image. If that cluster has only one image, or very few images, it is an indication that the image might be an image in which the object of interest is not completely in the field of view. The detection device may automatically remove such isolated reference images. Additionally, the detection device may remove images that were indicated by an operator who can decide whether to use an image as a reference image.

Then in block B370, the detection device outputs or stores the remaining dimensionality-reduced and aligned training images as the reference images. Finally, the flow ends in block B380.

Figure 4:
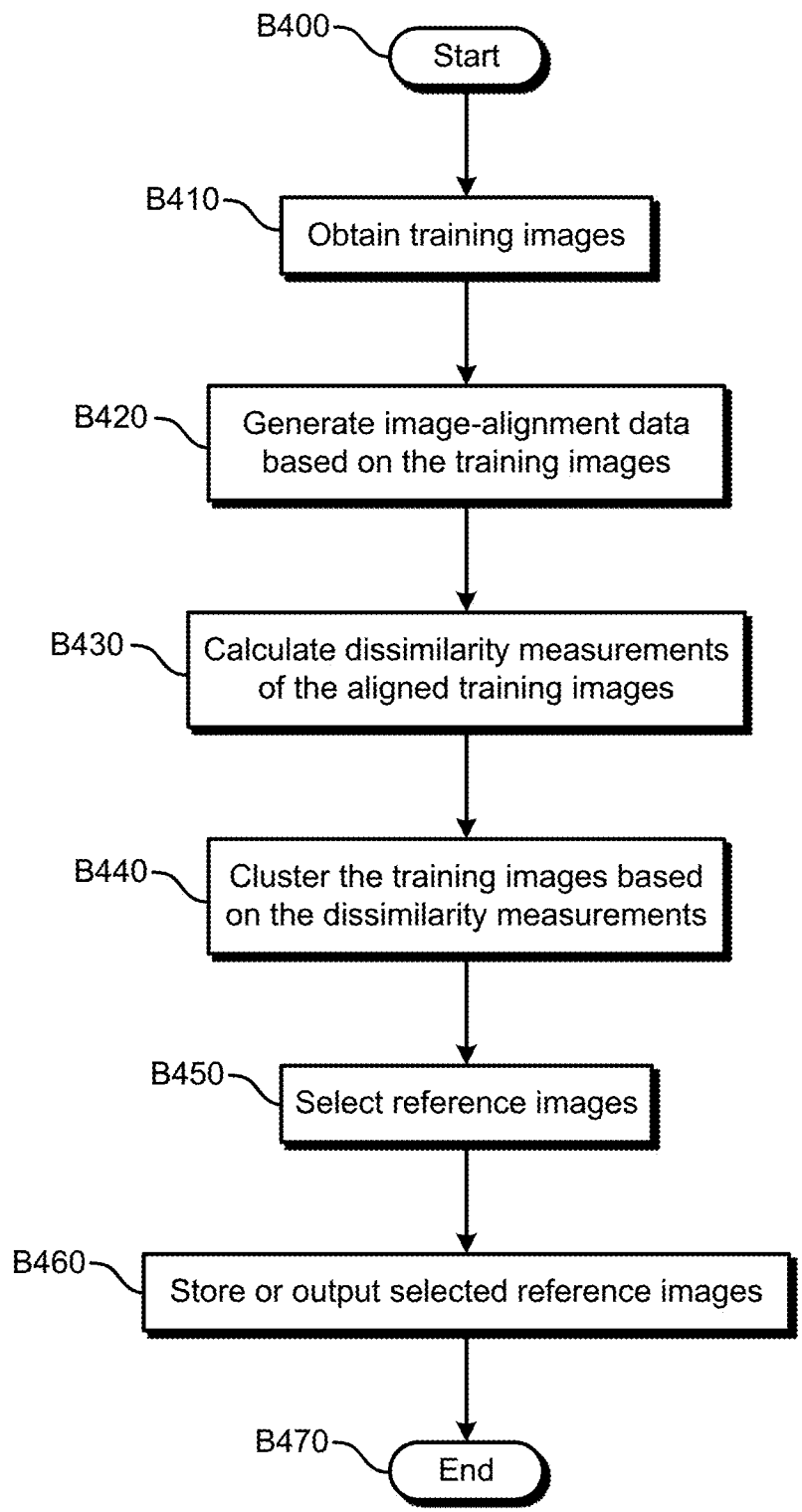
FIG. 4 illustrates an example embodiment of an operational flow for selecting reference images.
Figure 5:
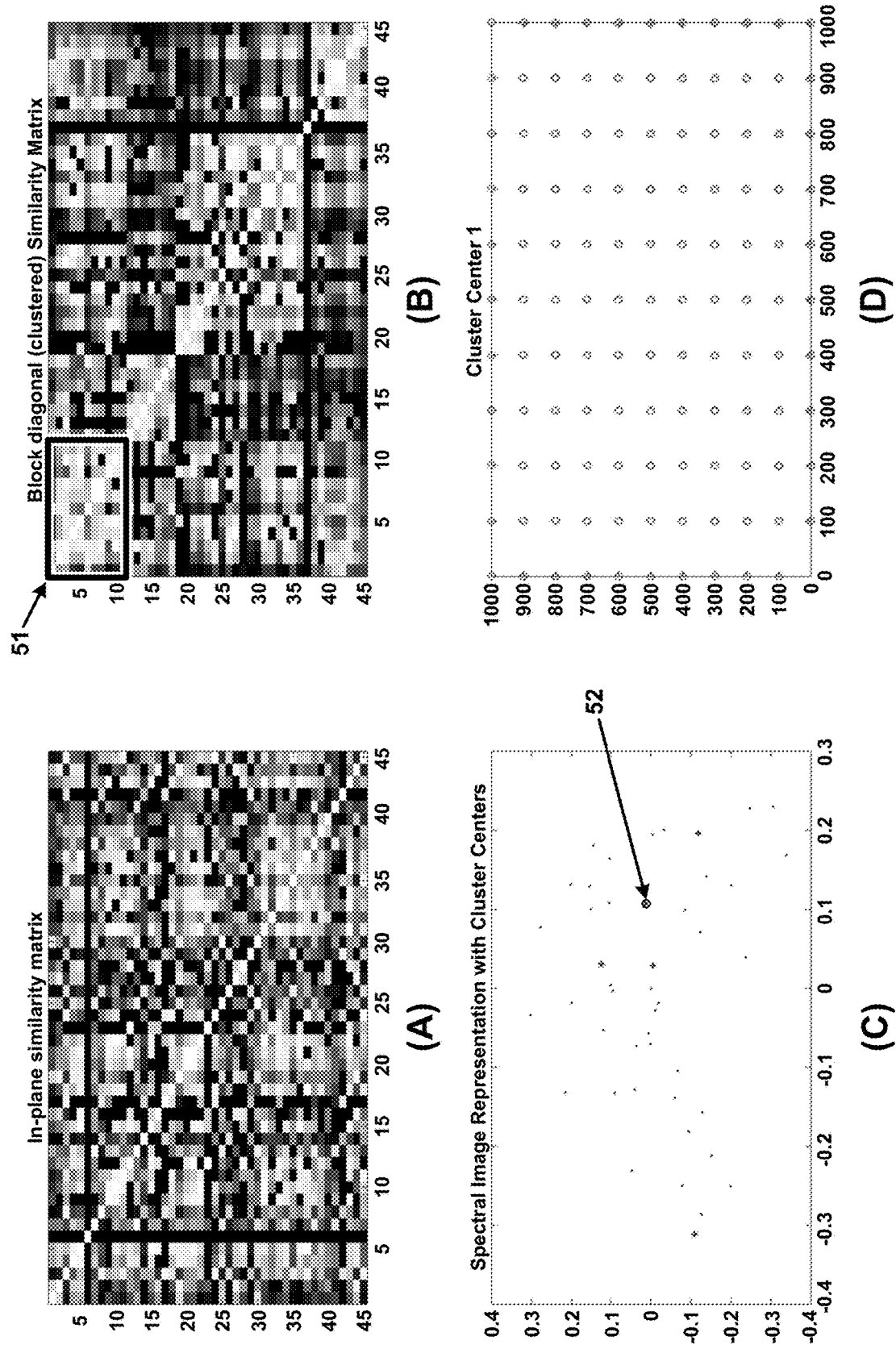
FIG. 5 illustrates example embodiments of a weight matrix, a clustered similarity matrix, a projection of an image into a Laplacian eigenspace, and a warping caused by a cluster centroid.
Figure 6:
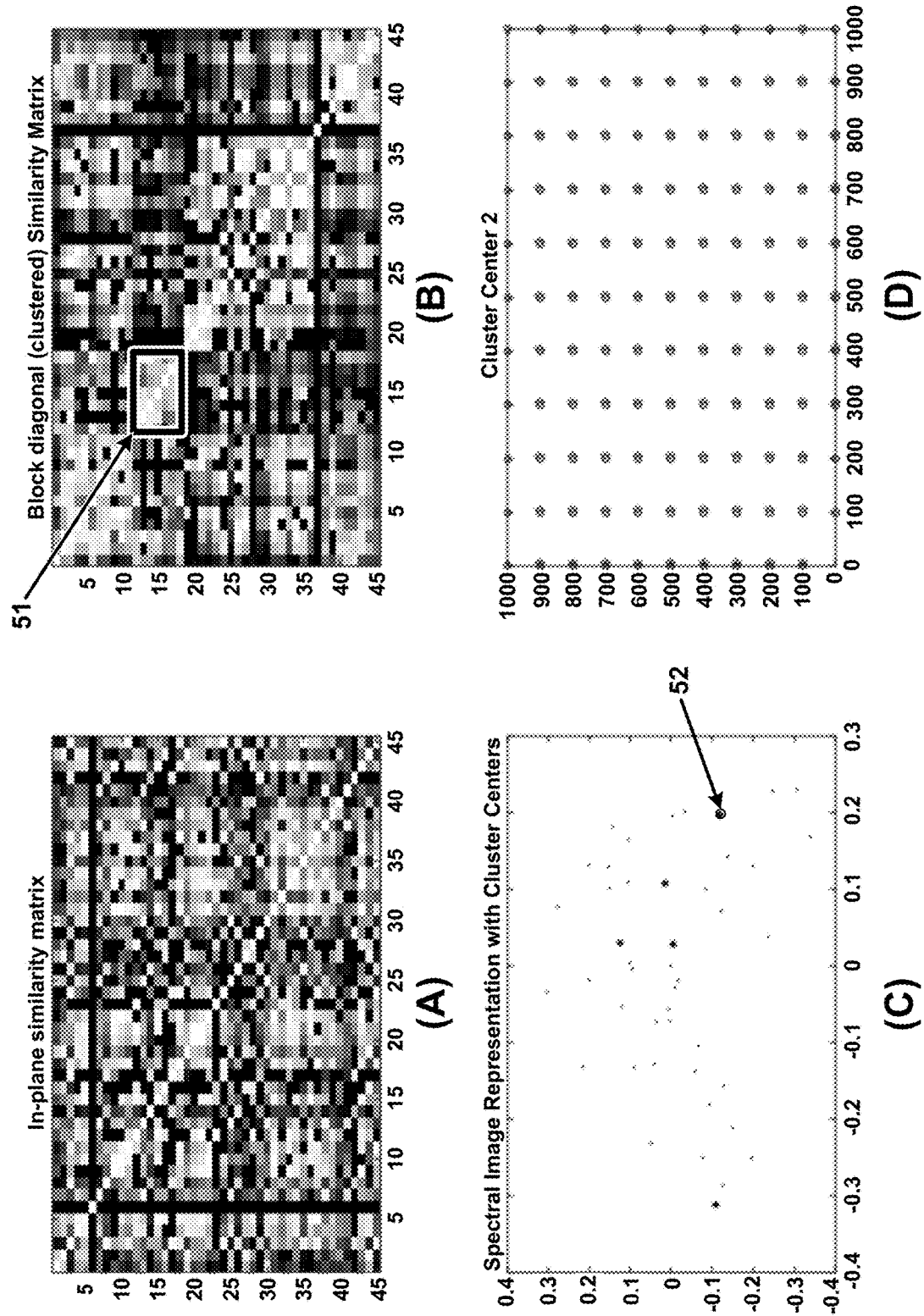
FIG. 6 illustrates example embodiments of a weight matrix, a clustered similarity matrix, a projection of an image into a Laplacian eigenspace, and a warping caused by a cluster centroid.
Figure 7:
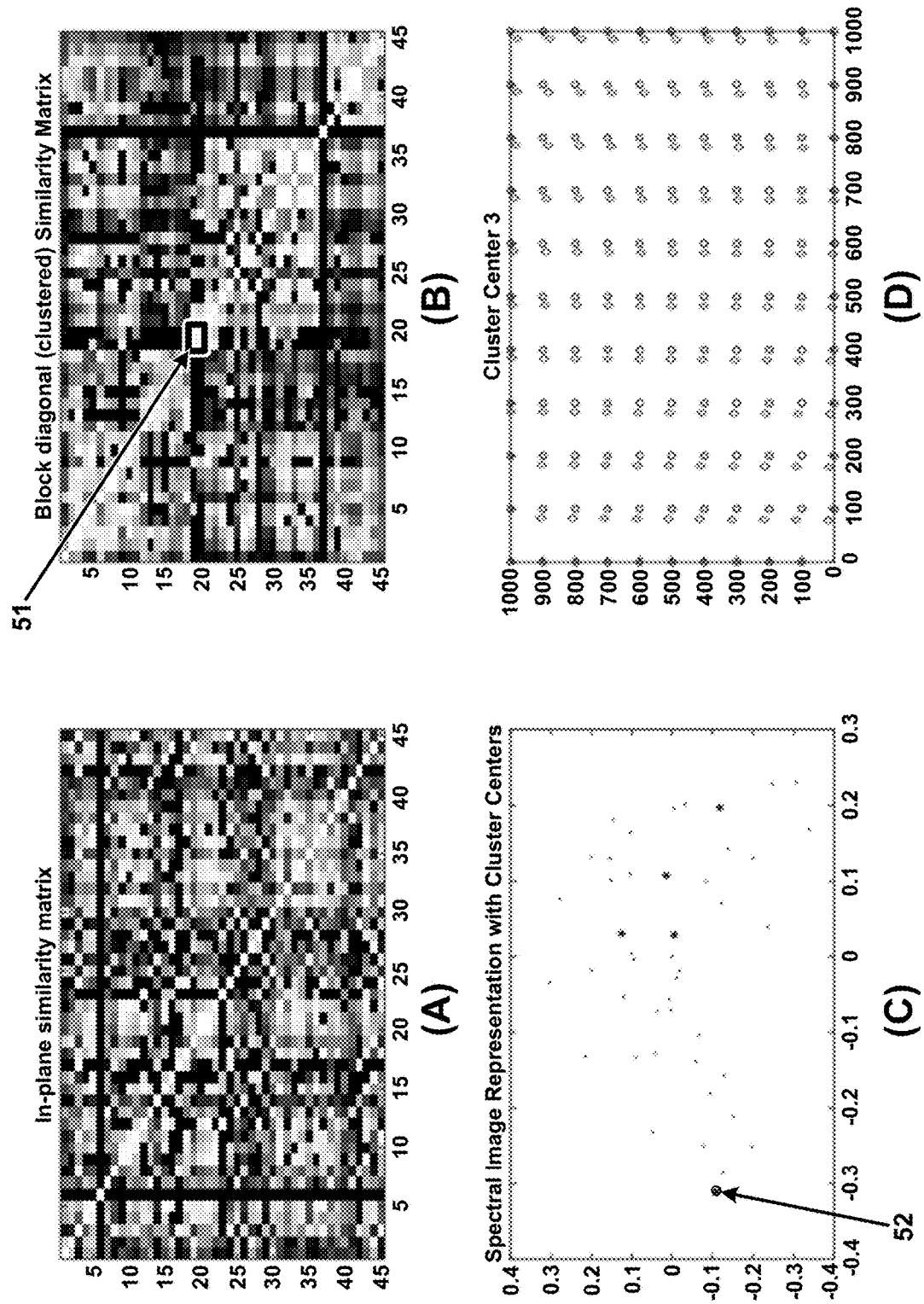
FIG. 7 illustrates example embodiments of a weight matrix, a clustered similarity matrix, a projection of an image into a Laplacian eigenspace, and a warping caused by a cluster centroid.
Figure 8:
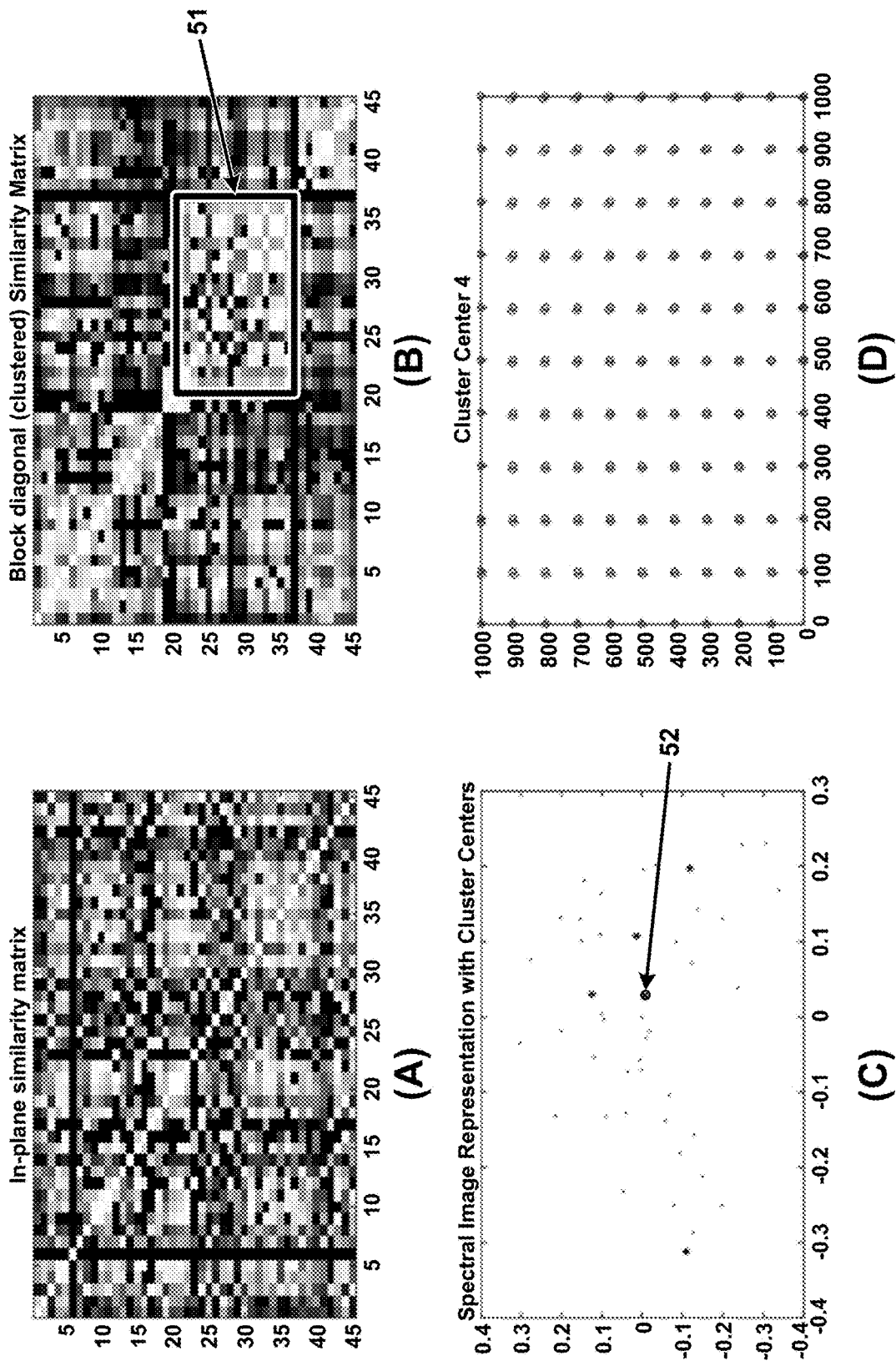
FIG. 8 illustrates example embodiments of a weight matrix, a clustered similarity matrix, a projection of an image into a Laplacian eigenspace, and a warping caused by a cluster centroid.
Figure 9:
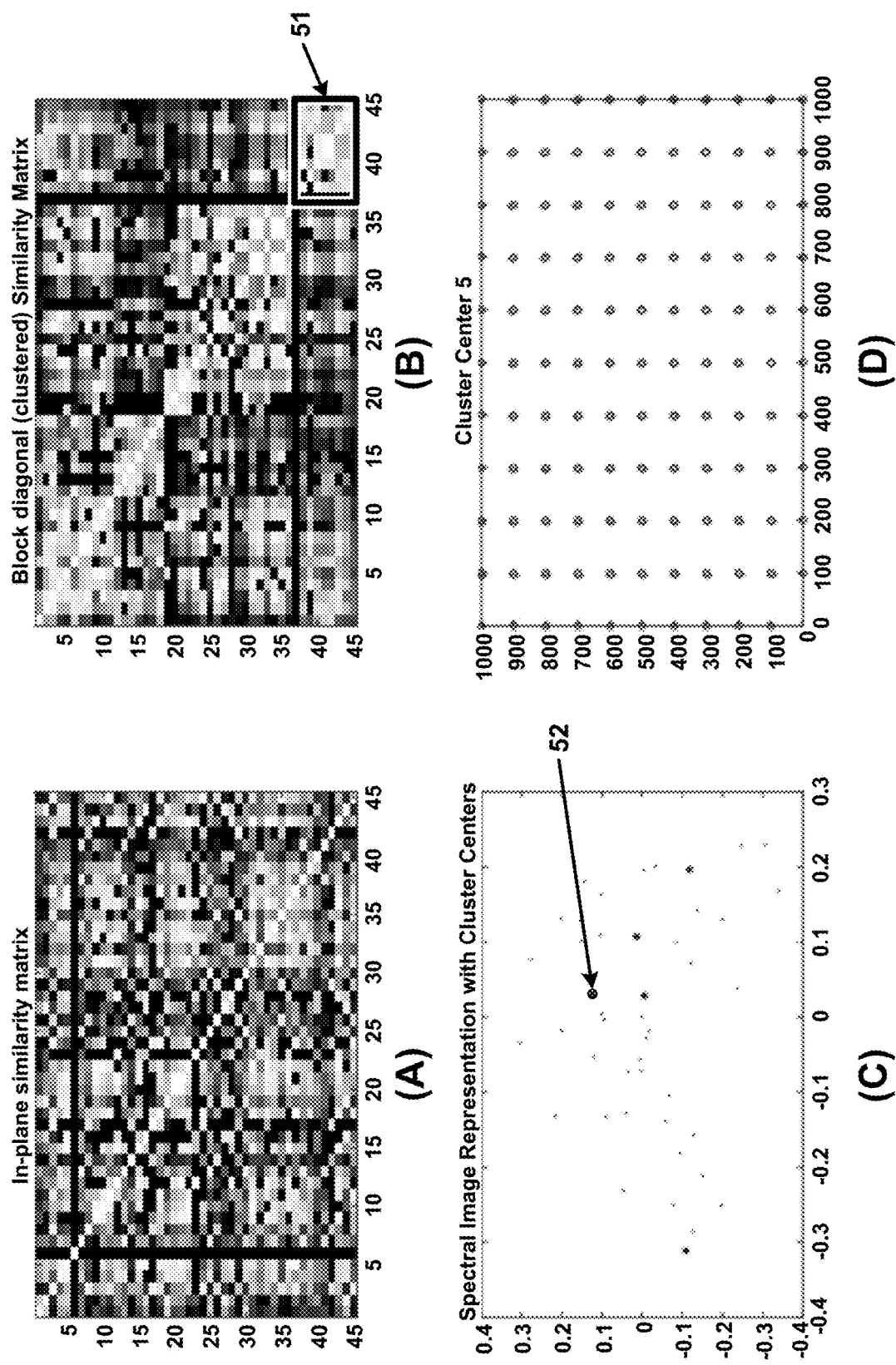
FIG. 9 illustrates example embodiments of a weight matrix, a clustered similarity matrix, a projection of an image into a Laplacian eigenspace, and a warping caused by a cluster centroid.

FIG. 4 illustrates an example embodiment of an operational flow for selecting reference images. The flow starts in block B400 and then moves to block B410, where the detection device obtains training images (e.g., a set of training images).

Next, in block B420, the detection device generates image-alignment data based on the training images. In this embodiment, the image-alignment data are transformations between training images that approximately capture out-of-plane alignments. In some circumstances, two images can be aligned to some degree using a two-dimensional (2D) affine transformation. In some embodiments, a transformation that takes the point (x, y) and transforms it to (x', y') can be described by the following:

$$\begin{bmatrix} x' \\ y' \\ 1 \end{bmatrix} = T \begin{bmatrix} x \\ y \\ 1 \end{bmatrix} = \begin{bmatrix} A & \begin{matrix} \delta_x \\ \delta_y \end{matrix} \\ \hline 0 \quad 0 & 1 \end{bmatrix} \begin{bmatrix} x \\ y \\ 1 \end{bmatrix}, \qquad (4)$$

where A is a 2×2 matrix; where and $\delta_x$ and $\delta_y$ are translation amounts; and where T is the 3×3 affine transformation matrix, which can be described by matrix A, a 2D translation column vector $\delta$, and a constant row of zeros with a one at the bottom-right corner. In this embodiment, the affine transformation matrix T describes a 2D transformation. There are various techniques to compute the affine transformation matrix T for any two given images. For example, the Matlab function imregtform generates such a matrix given two images.

Some embodiments of the detection device calculate a transformation (e.g., an affine transformation matrix) for each pair of training images. For example, for N images, some embodiments of the detection device calculate $$\binom{N}{2} = \frac{N(N-1)}{2}$$

pairs of transformations.

Some image manipulations (e.g., alignment) can handle translation, scale, and in-plane rotation. However, out-of-plane rotations of the object being acquired create non-linear transformations of the image. Therefore, affine transformations may be used to allow for some degree of image warping due to out-of-plane rotations. But for images of three-dimensional (3D) objects, affine transformations may not be able to transform the images to a standard view. As an example, to further describe this effect in an extreme case, the lateral view of an x-ray image of an object cannot be reliably reconstructed from an image of a single frontal x-ray view of the object.

Accordingly, in block B430, the detection device calculates one or more dissimilarity measurements. In some embodiments, the dissimilarity measurements are based on one or both of the training images and the image-alignment data (transformations) that were generated in block B420. Because of the challenge caused by out-of-plane rotations, some embodiments of the detection device select training images that can represent a wider variety of out-of-plane views. And some embodiments of the detection device measure the degree of out-of-plane rotation by examining the unequal scaling of the two image dimensions. The translation portion of the transform $T_{ij}$ between image i and image j may be denoted by $\delta_x$ and $\delta_y$. A pure rotation matrix contained in the submatrix A would be an orthogonal matrix, meaning its transpose is also its inverse: $AA^T = I$. In some embodiments, if the transformation also provides an image scaling factor s, then $AA^T = s^2 I$.

Also, the detection device may determine the eigenvalues for $AA^T$, denoted by $\lambda_1$ and $\lambda_2$. If the A matrix represents a scale and rotation, then the eigenvalues will be equal. Thus, some embodiments of an out-of-plane rotation dissimilarity measurement can be described by the following:

$$\rho_{ij} = \left( \frac{|\lambda_2|}{|\lambda_1|} \right) - 1, \qquad (5)$$

where the eigenvalues are ordered such that $|\lambda_1| \leq |\lambda_2|$. Thus $\rho_{ij} \geq 0$. Note that for all invertible transformations A, $AA^T$ is positive definite, and the eigenvalues are expected to be both positive and real.

Also, the detection device may describe or represent the dissimilarity measurements with one or more graphs (a graph-theory-based representation), where each image pair is connected via a dissimilarity measurement, for example a weight $w_{ij}$. There are various ways to generate (e.g., calculate, construct) the weight $w_{ij}$. For example, some embodiments use a Gaussian kernel and can be described by the following:

$$w_{ij} = e^{\frac{\rho_{ij}^2}{2\sigma^2}}, \qquad (6)$$

where $\sigma^2$ is a scaling parameter that may be used to adjust the relative connection strengths in the graph.

The flow then moves to block B440, where the detection device clusters the training images based on the dissimilarity measurements (e.g., the weights $w_{ij}$). In some embodiments, the detection device also performs a dimensionality reduction while performing the clustering, for example by performing spectral clustering or using other graph-spectral techniques.

For example, some embodiments of the detection device generate a weight matrix W that can be described by the following:

$$W = \begin{bmatrix} w_{11} & \cdots & w_{1N} \\ \vdots & \ddots & \vdots \\ w_{N1} & \cdots & w_{NN} \end{bmatrix}. \quad (7)$$

And some embodiments of the detection device also generate a normalized graph Laplacian, for example a normalized graph Laplacian that can be described by the following:

$$L = I - D1/2 WD1/2, \quad (8)$$

where D is a diagonal matrix with diagonal elements: $D_{ii} = \Sigma_j w_{ij}$.

Some embodiments of the detection device perform spectral clustering that takes the eigenvectors that correspond to the first k non-trivial smallest eigenvalues of the Laplacian as a representation of the N images in a k-dimensional space. Thus, some embodiments reduce the rank of the Laplacian, or in other words reduce the dimensionality of the space spanned by the Laplacian. In some embodiments, each row of a matrix that contains the k eigenvectors as columns represents a point in k-dimensional space, and k-means clustering is performed in the new space to cluster the training images, thereby clustering the training images based at least in part on out-of-plane rotations.

Next, in block B450, the detection device selects one or more reference images. For example, the detection device may select a cluster centroid (reference image) by selecting the cluster member (training image) of the members (training images) within a cluster that has the minimum sum of out-of-plane dissimilarities. In some embodiments, the cluster centroid is the cluster member that has the smallest median out-of-plane dissimilarity with the cluster members. By using the median, the centroid may make defect detection that uses the reference images more robust to alignment outliers that are caused by misalignments. And some embodiments use other methods to choose the cluster centroid, for example, largest cluster outlier and random selection.

In block B460, the detection device stores or outputs the selected reference images, and then the flow ends in block B470.

One example embodiment of a detection device performed the operations in blocks B400-B460 on 45 training images. The 45 images were aligned in all pair-wise combinations, which produced 45 choose 2 combinations, which equals 990 pairs of alignments to perform. The detection device then constructed a graph weight matrix using the out-of-plane distances and a Gaussian kernel. And the detection device then spectrally clustered the images into five clusters based on the graph. The results are shown in FIGS. 5-9, which illustrate example embodiments of a weight matrix, a clustered similarity matrix, a projection of an image into a Laplacian eigenspace, and a warping caused by a cluster centroid.

In FIGS. 5-9, (A) shows the graph weight matrix. The y axis shows the indexes of the 45 images, and the x axis shows the indexes of the 45 images. The shading of the rectangles in the graph indicates the weight between the image at the index on the y axis and the image at the index on the x axis, where a lighter shading indicates a smaller weight. For example, in FIG. 5(A), the shading of the top-right rectangle indicates the weight between image 1 and image 45. The diagonal from the top-left to the bottom right show light rectangles because these rectangles show the similarity weights between an image an itself (e.g., the top-left rectangle shows the distance between image 1 and itself). (B) shows the results after the detection device spectrally clustered the training images into five clusters based on the graph weight matrix and rearranged the rows and columns accordingly. The graph clusters 51 indicate the similarity weights between the respective images in the clusters. For example, the graph cluster 51 in FIG. 5(B) shows the weights between the images that are in the first cluster. (C) shows the projections of the images in the Laplacian eigenspace (3rd and 4th eigenvectors) along with the five cluster centroids and highlights the cluster centroid 52 that corresponds to the graph cluster 51 in (B). (D) shows the warping caused by the highlighted cluster centroid 52 relative to the first image in the dataset.

Figure 10:
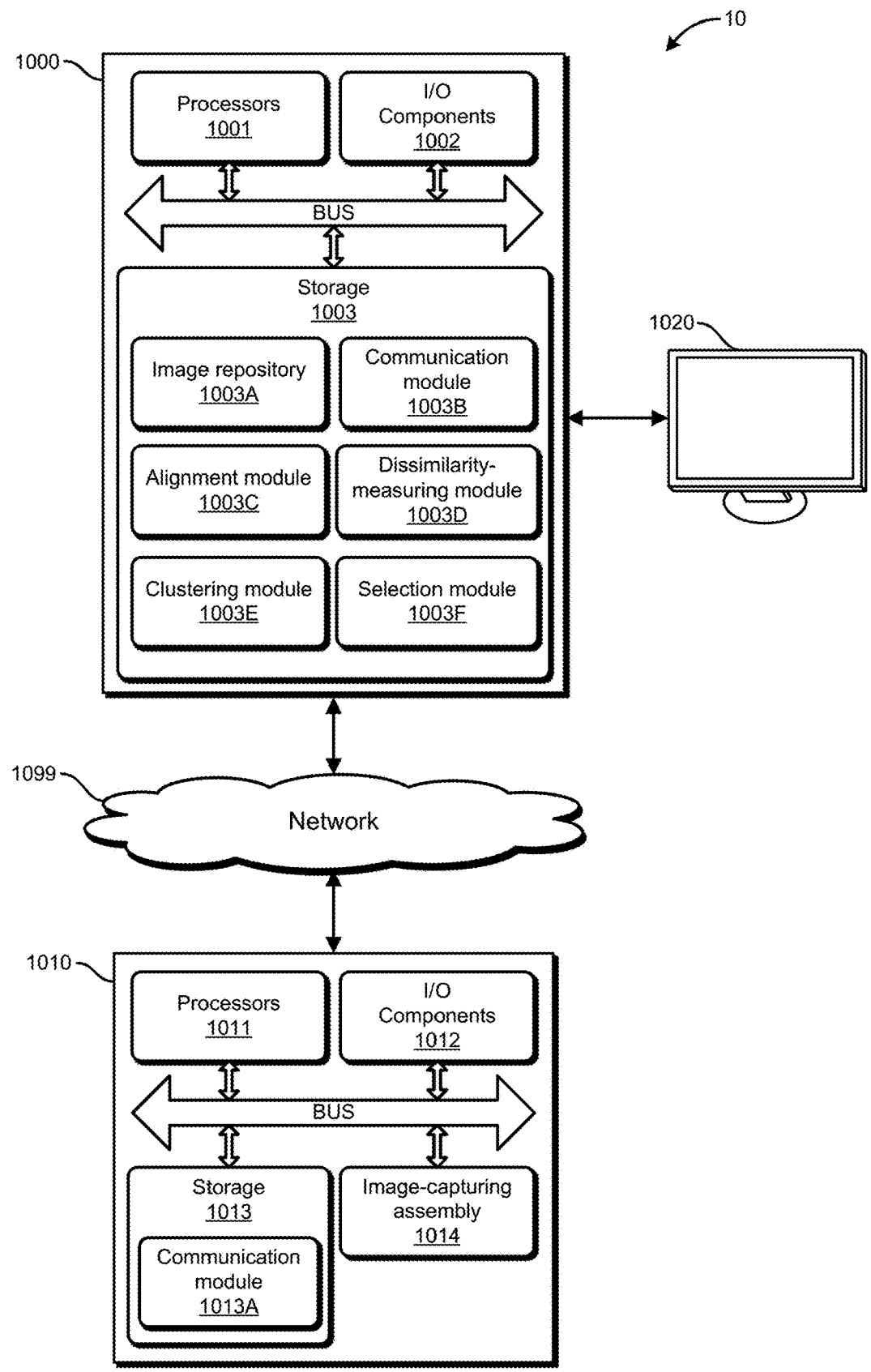
FIG. 10 illustrates an example embodiment of a system for image-feature detection.

FIG. 10 illustrates an example embodiment of a system for image-feature detection. The system 10 includes a detection device 1000, which is a specially-configured computing device; an image-capturing device 1010; and a display device 1020. In this embodiment, the detection device 1000 and the image-capturing device 1010 communicate via one or more networks 1099, which may include a wired network, a wireless network, a LAN, a WAN, a MAN, and a PAN. Also, in some embodiments the devices communicate via other wired or wireless channels.

The detection device 1000 includes one or more processors 1001, one or more I/O components 1002, and storage 1003. Also, the hardware components of the detection device 1000 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1001 include one or more central processing units (CPUs), which may include one or more microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1002 include communication components (e.g., a graphics card, a network-interface controller) that communicate with the display device 1020, the network 1099, the image-capturing device 1010, and other input or output devices (not illustrated), which may include a keyboard, a mouse, a printing device, a touch screen, a light pen, an optical-storage device, a scanner, a microphone, a drive, and a game controller (e.g., a joystick, a gamepad).

The storage 1003 includes one or more computer-readable storage media. As used herein, a computer-readable storage medium, in contrast to a mere transitory, propagating signal per se, refers to a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1003, which may include both ROM and RAM, can store computer-readable data or computer-executable instructions.

The detection device 1000 also includes an image repository 1003A, a communication module 1003B, an alignment module 1003C, a dissimilarity-measuring module 1003D, a clustering module 1003E, and a selection module 1003F. A module includes logic, computer-readable data, or computer-executable instructions. In the embodiment shown in FIG. 10, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 1003. Also, in some embodiments, the detection device 1000 includes additional or fewer modules, the modules are combined into fewer modules, or the modules are divided into more modules.

The image repository 1003A stores images, for example training images, reference images, and aligned images.

The communication module 1003B includes instructions that cause the detection device 1000 to communicate with one or more other devices (e.g., the image-capturing device 1010, the display device 1020), for example to obtain one or more images from the other devices or to send one or more images to the other devices.

The alignment module 1003C includes instructions that cause the detection device 1000 to generate image-alignment data (e.g., images that have been aligned to an alignment-target image, transformations). Some embodiments of the alignment module 1003C include instructions that cause the detection device 1000 to perform the operations that are described in block B220 in FIG. 2, in blocks B320-B330 in FIG. 3, or in block B420 in FIG. 4.

The dissimilarity-measuring module 1003D includes instructions that cause the detection device 1000 to calculate dissimilarity measurements that indicate dissimilarities between images or to generate a graph based on the dissimilarity measurements. Some embodiments of the dissimilarity-measuring module 1003D include instructions that cause the detection device 1000 to perform the operations that are described in block B430 in FIG. 4.

The clustering module 1003E includes instructions that cause the detection device 1000 to cluster the training images based on image-alignment data, for example by clustering an alignment-target image and training images that have been aligned to the alignment-target image. Some embodiments of the clustering module 1003E include instructions that cause the detection device to perform dimensionality reduction on training images or on image-alignment data (e.g., training images that have been aligned to an alignment-target image) and cluster the training images based on the dimensionality-reduced training images or image-alignment data. Some embodiments of the clustering module 1003E include instructions that cause the detection device 1000 to perform the operations that are described in block B230 in FIG. 2, in blocks B340-B350 in FIG. 3, or in block B440 in FIG. 4.

The selection module 1003F includes instructions that cause the detection device 1000 to select one or more training images as reference images based on clusters of training images. Some embodiments of the selection module 1003F include instructions that cause the detection device 1000 to perform the operations that are described in blocks B240-B250 in FIG. 2, in blocks B360-B370 in FIG. 3, or in blocks B450-B460 in FIG. 4.

The image-capturing device 1010 includes one or more processors 1011, one or more I/O components 1012, storage 1013, a communication module 1013A, and an image-capturing assembly 1014. The image-capturing assembly 1014 includes one or more image sensors and may include one or more lenses and an aperture. The communication module 1013A includes instructions that, when executed, or circuits that, when activated, cause the image-capturing device 1010 to capture an image, receive a request for an image from a requesting device, retrieve a requested image from the storage 1013, or send a retrieved image to the requesting device (e.g., the detection device 1000).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Additionally, some embodiments of the devices, systems, and methods combine features from two or more of the embodiments that are described herein. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
   one or more computer-readable storage media; and
   one or more processors that are configured to cause the device to perform operations including:
      obtaining training images;
      generating image-alignment data based on the training images, wherein generating the image-alignment data includes generating respective transformations between pairs of images of the training images;
      clustering the training images based at least in part on the image-alignment data, thereby generating clusters of training images; and
      selecting one or more representative images from the training images based on the clusters of training images.

2. The device of claim 1, wherein generating the image-alignment data includes:
   selecting a target-alignment image of the training images, and
   aligning the other images of the training images to the target-alignment image, thereby generating aligned training images.

3. The device of claim 1, wherein the transformations are affine transformations that transforms point (x, y) to point (x', y') as described by $$\begin{bmatrix} x' \\ y' \\ 1 \end{bmatrix} = T \begin{bmatrix} x \\ y \\ 1 \end{bmatrix} = \begin{bmatrix} A \mid \begin{smallmatrix} \delta_x \\ \delta_y \end{smallmatrix} \\ \hline 0\ 0 \mid 1 \end{bmatrix} \begin{bmatrix} x \\ y \\ 1 \end{bmatrix},$$

where A is a 2×2 matrix; where and $\delta_x$ and $\delta_y$ are translation amounts; and where T is a 3×3 affine transformation matrix that can be described by matrix A, a two-dimensional translation column vector δ, and a constant row of zeros with a one at the bottom-right corner.

4. The device of claim 1, wherein generating the image-alignment data includes:
   generating $$\binom{N}{2}$$

transformations, where N is the number of training images.

5. The device of claim 1, wherein the operations further include:
   generating reduced-dimensionality representations of the image-alignment data, and
   wherein clustering the training images is based on the reduced-dimensionality representations of the image-alignment data.

6. The device of claim 1, wherein selecting the one or more representative images from the training images based on the clusters of training images includes:
   selecting a respective centroid image or a respective median image from one or more clusters of the clusters of training images as a representative image of a cluster of the one or more clusters.

7. The device of claim 1, wherein the operations further include:
   calculating dissimilarity measurements between the training images,
   wherein clustering the training images is further based on the dissimilarity measurements.

8. The device of claim 7, wherein each of the dissimilarity measurements measures a dissimilarity between a respective pair of images of the training images.

9. A method comprising:
   obtaining training images;
   generating image-alignment data based on the training images, wherein generating the image-alignment data includes generating respective transformations between pairs of images of the training images;
   clustering the training images based at least in part on the image-alignment data, thereby generating clusters of training images; and
   selecting representative images from the training images based on the clusters of training images.

10. The method of claim 9, wherein generating the image-alignment data includes:
    selecting a target-alignment image of the training images, and
    aligning the other images of the training images to the target-alignment image, thereby generating aligned training images.

11. The method of claim 9, further comprising:
    calculating dissimilarity measurements between the training images,
    wherein clustering the training images is further based on the dissimilarity measurements.

12. The method of claim 11, further comprising:
    reducing a dimensionality of the dissimilarity measurements, thereby generating reduced-dimensionality dissimilarity measurements,
    wherein clustering the training images is further based on the reduced- dimensionality dissimilarity measurements.

13. The method of claim 12, wherein selecting the representative images from the training images based on the clusters of training images includes:
    selecting at least some of the training images that are in the clusters of training images that include more than a threshold number of training images as the representative images.

14. One or more computer-readable media storing instructions that, when executed by one or more computing devices, cause the one or more computing devices to execute operations comprising:
    obtaining training images;
    generating image-alignment data based on the training images, wherein the image-alignment data include pair-wise transformations between pairs of the training images;
    clustering the training images based at least in part on the image-alignment data, thereby generating clusters of training images; and
    selecting representative images from the training images based on the clusters of training images.

15. The one or more computer-readable media of claim 14, wherein the image-alignment data include respective pair-wise transformations between a target-alignment image of the training images and other images of the training images.

16. The one or more computer-readable media of claim 14, wherein selecting the representative images from the training images based on the clusters of training images includes:
    selecting a respective centroid image or a respective median image from a cluster of the clusters of training images as a representative image of the cluster.

17. A device comprising:
    one or more computer-readable storage media; and
    one or more processors that are configured to cause the device to perform operations including:
       obtaining training images;
       generating image-alignment data based on the training images;
       generating reduced-dimensionality representations of the image-alignment data;
       clustering the training images based at least in part on the reduced- dimensionality representations of the image-alignment data, thereby generating clusters of training images; and selecting one or more representative images from the training images based on the clusters of training images.

18. A method comprising:
obtaining training images;
generating image-alignment data based on the training images;
calculating dissimilarity measurements between the training images;
reducing a dimensionality of the dissimilarity measurements, thereby generating reduced-dimensionality dissimilarity measurements;
clustering the training images based at least in part on the image-alignment data and at least in part on the reduced-dimensionality dissimilarity measurements, thereby generating clusters of training images; and
selecting representative images from the training images based on the clusters of training images.

19. One or more computer-readable media storing instructions that, when executed by one or more computing devices, cause the one or more computing devices to execute operations comprising:
obtaining training images;
generating image-alignment data based on the training images;
calculating dissimilarity measurements between the training images based on the image-alignment data;
reducing a dimensionality of the dissimilarity measurements, thereby generating reduced-dimensionality dissimilarity measurements;
clustering the training images based at least in part on the reduced-dimensionality dissimilarity measurements, thereby generating clusters of training images; and
selecting representative images from the training images based on the clusters of training images.

20. The device of claim 2, wherein the respective transformations between the pairs of images of the training images include
respective transformations between the target-alignment image and each of the other images of the training images.

21. The device of claim 7, wherein the dissimilarity measurements are calculated based on the image-alignment data.

* * * * *